US006554145B1

(12) United States Patent
Fantuzzi

(10) Patent No.: US 6,554,145 B1
(45) Date of Patent: Apr. 29, 2003

(54) UNIVERSAL TRAVERSING ASSEMBLY FOR LEGS OF CRANES OR THE LIKE

(75) Inventor: Luciano Fantuzzi, Brescello (IT)

(73) Assignee: Fantuzzi-Reggiane S.p.A. (IT)

(*) Notice: Subject to any disclaimer, the term of this patent is extended or adjusted under 35 U.S.C. 154(b) by 23 days.

(21) Appl. No.: 09/678,006

(22) Filed: Oct. 3, 2000

(30) Foreign Application Priority Data

Oct. 8, 1999 (IT) ........................................ M099A0220

(51) Int. Cl.⁷ ................................................ B62D 51/06
(52) U.S. Cl. ......................... 212/344; 180/8.6; 212/324
(58) Field of Search ................................ 212/301, 324, 212/344; 180/8.5, 8.6

(56) References Cited

U.S. PATENT DOCUMENTS

| | | | | | |
|---|---|---|---|---|---|
| 1,615,055 | A | * | 1/1927 | Turner | 180/8 |
| 2,914,127 | A | * | 11/1959 | Ricouard | 180/8 |
| 3,118,419 | A | * | 1/1964 | Bell | 115/1 |
| 3,246,775 | A | | 4/1966 | Connelly | |
| 3,249,168 | A | * | 5/1966 | Klein et al. | 180/8 |
| 3,576,225 | A | * | 4/1971 | Chambers | 180/8 |
| 3,836,015 | A | * | 9/1974 | Travis | 214/1 P |
| 4,068,487 | A | * | 1/1978 | Pease et al. | 61/93 |
| 5,921,336 | A | * | 7/1999 | Reed | 180/8.1 |

FOREIGN PATENT DOCUMENTS

| | | |
|---|---|---|
| BE | 540 303 | 8/1955 |
| FR | 704 447 | 5/1931 |
| FR | 1 383 430 | 4/1965 |

* cited by examiner

*Primary Examiner*—Thomas J. Brahan
(74) *Attorney, Agent, or Firm*—Wolf, Greenfield & Sacks, P.C.

(57) ABSTRACT

A universal traversing assembly for legs of cranes or the like comprises: a platform provided with a series of driving wheels and supporting wheels which are aligned and are adapted to roll on a long underlying rail for the traversing motion of the leg; a box-like tunnel which rests on the ground, is open in an upward region, and has a portion of the rail fixed to its base; at least one pair of idler wheels, which are freely mounted on the platform, are mutually coaxial and are arranged below a pair of upper guides which are fixed on the tunnel at the upper opening; a rack which is fixed to the side of the rail portion and is adapted to mesh with pinions which are rigidly coupled and coaxial with respect to the driving wheels; at least one motorization unit which is rigidly coupled to the platform and is coupled to at least one of the driving wheels and pinions; at least one stabilizer which comprises at least one ground resting foot which has an adequate surface, can slide vertically and is adapted to move from a lowered configuration for supporting the leg to a raised inactive configuration, in the supporting configuration the tunnel being raised from the ground and the pinions being adapted to produce the traversing motion of the tunnel with respect to the leg, in the inactive configuration the tunnel resting on the ground and the driving wheels being adapted to produce the traversing motion of the leg with respect to the tunnel.

9 Claims, 4 Drawing Sheets

UNIVERSAL TRAVERSING ASSEMBLY FOR LEGS OF CRANES OR THE LIKE

CROSS-REFERENCE TO RELATED APPLICATIONS

This application claims priority to Italian Application No. M099A000220 filed Oct. 8, 1999, the disclosure of which is incorporated herein by reference.

BACKGROUND OF THE INVENTION

The present invention regards a universal traversing assembly for legs of cranes, or the like or mobile structures of other kinds.

Conventional traversing assemblies comprise one or more platforms which are fitted at the bottom of the legs of the crane or mobile structure and have a plurality of supporting wheels, some of which are driving wheels and some of which are driven wheels; said wheels are actuated by electric motors, or motors of another type, with conventional transmission systems interposed and are made to roll on rails fixed to the ground.

These traversing assemblies are not free from drawbacks, including the fact that the rails on which the crane is to be arranged generally predate the crane, and therefore might not be adapted to support that specific crane model that is used.

In particular, the gauge of the track, i.e. the distance between the two rails on which the pairs of mutually opposite legs rest, is often too small with respect to the dimensions of the crane, the balance of which is therefore precarious and unsteady.

In order to ensure stability, and hence safety of the operators and protect the integrity of the loads being carried, it is necessary to ballast the crane with additional weights, accordingly increasing the stress affecting the movement elements.

Another drawback consists in that the rails fixed to the ground have a preset position and length which, as such, cannot meet all the requirements for the movement of the cranes that arise in the various operating conditions, and long and expensive disassembly/reassembly work is necessary in order to modify them.

Moreover, conventional traversing assemblies use a large number of wheels, even a dozen, and this merely increases the constructive complexity, the large space occupation and the unevenness of operation.

SUMMARY OF THE INVENTION

The aim of the present invention is to eliminate the above noted drawbacks of conventional types of traversing assembly by providing a universal traversing assembly for legs of cranes or the like which allows each leg to perform a complete and independent traversing motion, to exactly size the gauge between the rails so as to always have structures stable and balanced without having to ballast them, to use the crane on any terrain, to render the traversing motion of the crane independent of long, fixed and existing rails and to modify the position and length of the rails according to the different operating conditions, without requiring work for modification, assembly and disassembly thereof.

An object of the present invention is to allow to place and use the crane in sites different from the initial ones, if this need arises due to war or other events, by rendering the traversing motion of the crane independent of the rails.

Within the scope of this aim, another object of the present invention is to achieve the above aim and object with a structure which is simple, relatively easy to provide in practice, safe in use, effective in operation, and relatively low in cost.

These and other objects are achieved by the present universal traversing assembly for legs of cranes or the like, comprising a platform provided with a plurality of driving wheels and supporting wheels which are aligned and are adapted to roll on a long underlying rail for the traversing motion of the leg, characterized in that it comprises: a box-like tunnel which rests on the ground, is open in an upward region, and has a portion of the rail fixed to its base; at least one pair of idler wheels, which are freely mounted on the platform, are mutually coaxial and are arranged below a pair of upper guides fixed on the tunnel at the upper opening; a rack which is fixed to the side of the rail portion and is adapted to mesh with pinions which are rigidly coupled and coaxial with respect to the driving wheels; at least one motorization assembly which is rigidly coupled to the platform and is coupled to at least one of said driving wheels and pinions; at least one stabilizer comprising at least one ground resting foot which has an adequate surface, can slide vertically and is adapted to move from a lowered configuration for supporting the leg to a raised inactive configuration, in said supporting configuration the tunnel being raised from the ground and the pinions being adapted to cause the traversing motion of the tunnel with respect to the leg, in the inactive configuration the tunnel resting on the ground and the driving wheels being adapted to cause the traversing motion of the leg with respect to the tunnel.

BRIEF DESCRIPTION OF THE DRAWINGS

Further characteristics and advantages of the present invention will become better apparent from the detailed description of a preferred but not exclusive embodiment of a universal traversing assembly for legs of cranes or the like, illustrated only by way of non-limitative example in the accompanying drawings, wherein.

DESCRIPTION OF THE PREFERRED EMBODIMENTS

Figure 1:
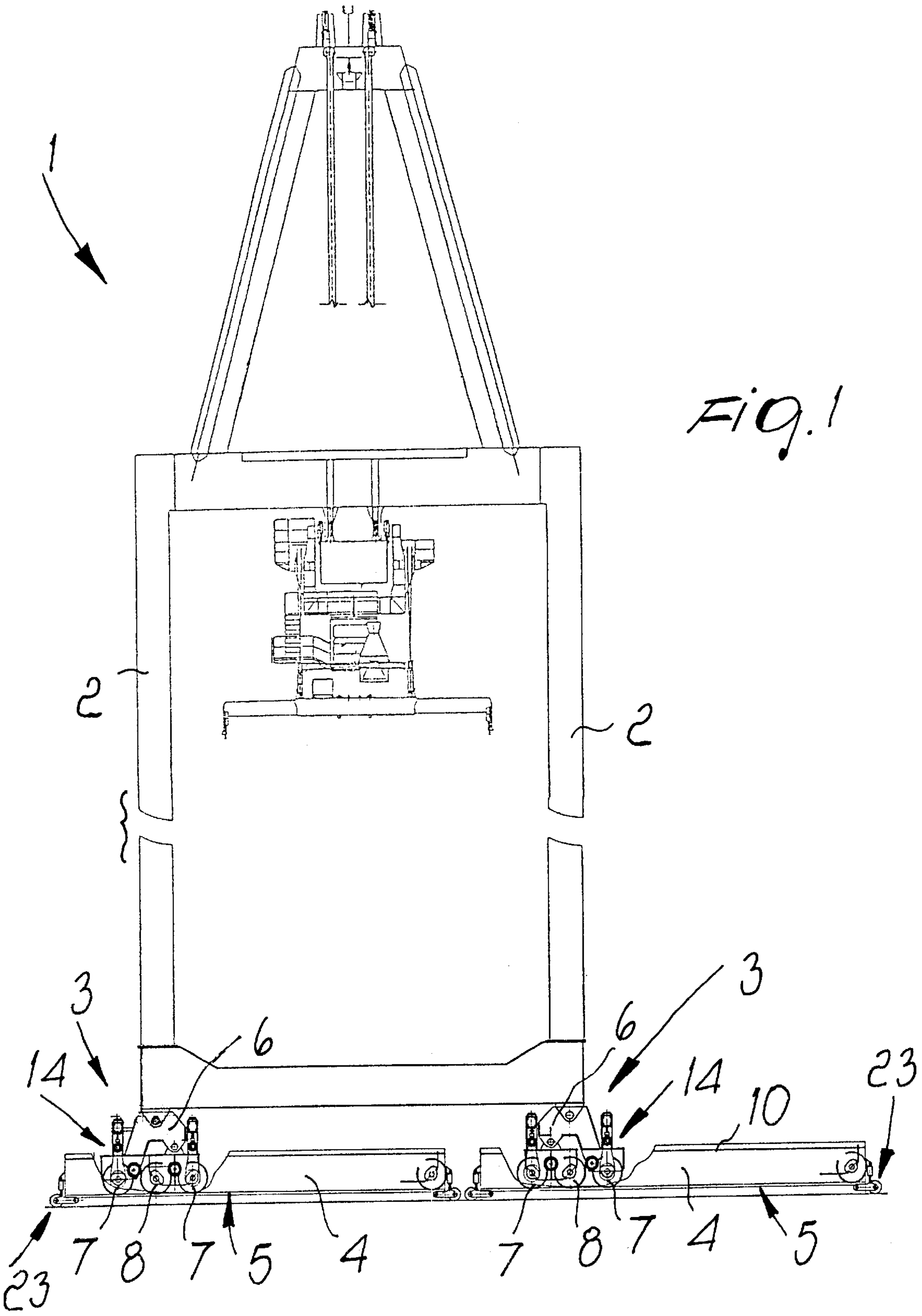
FIG. 1 is a schematic and partially sectional side view of a crane in which each leg is provided with a traversing assembly according to the invention.
Figure 2:
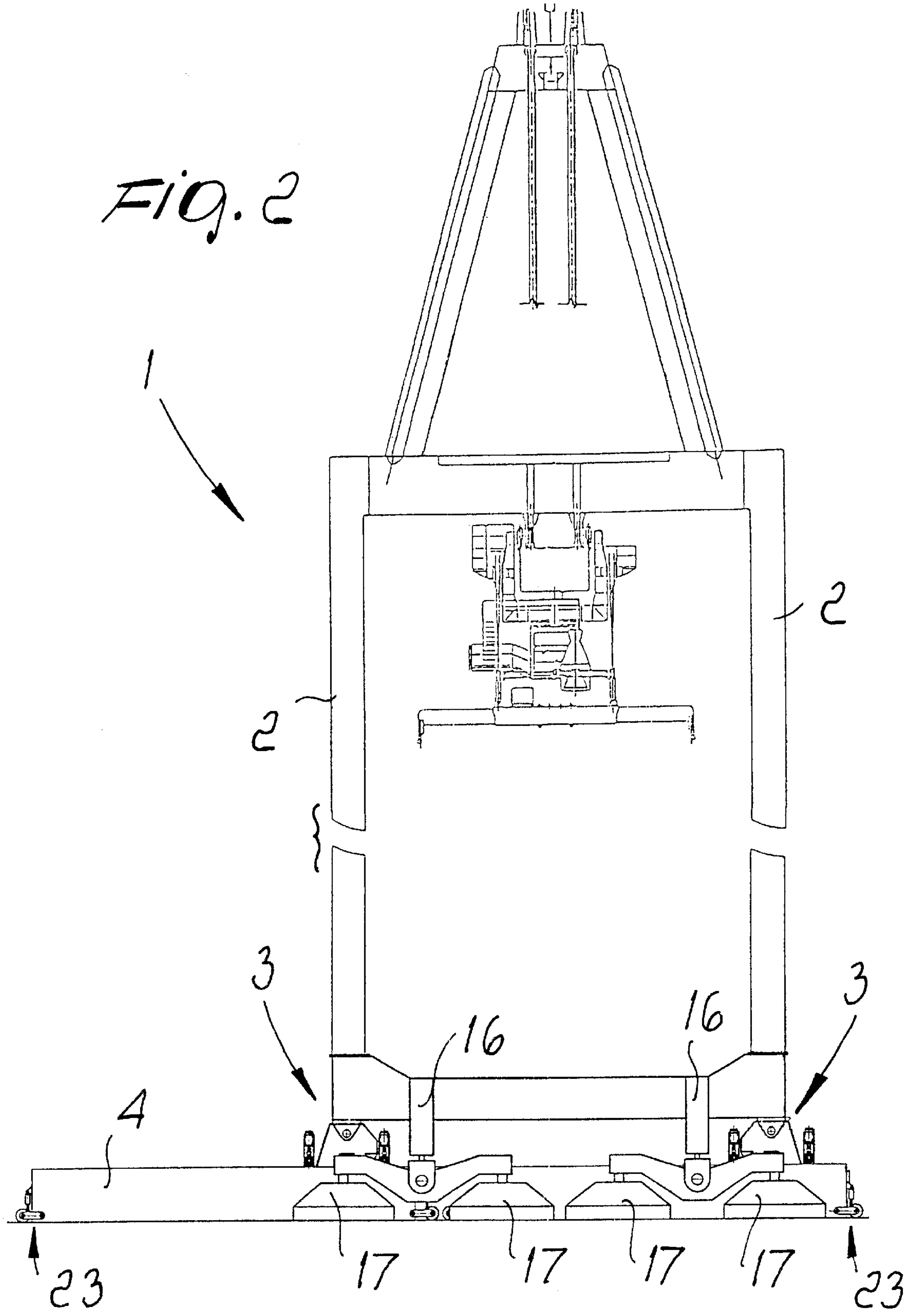
FIG. 2 is a non-sectional, schematic side view of the crane of FIG. 1.
Figure 3:
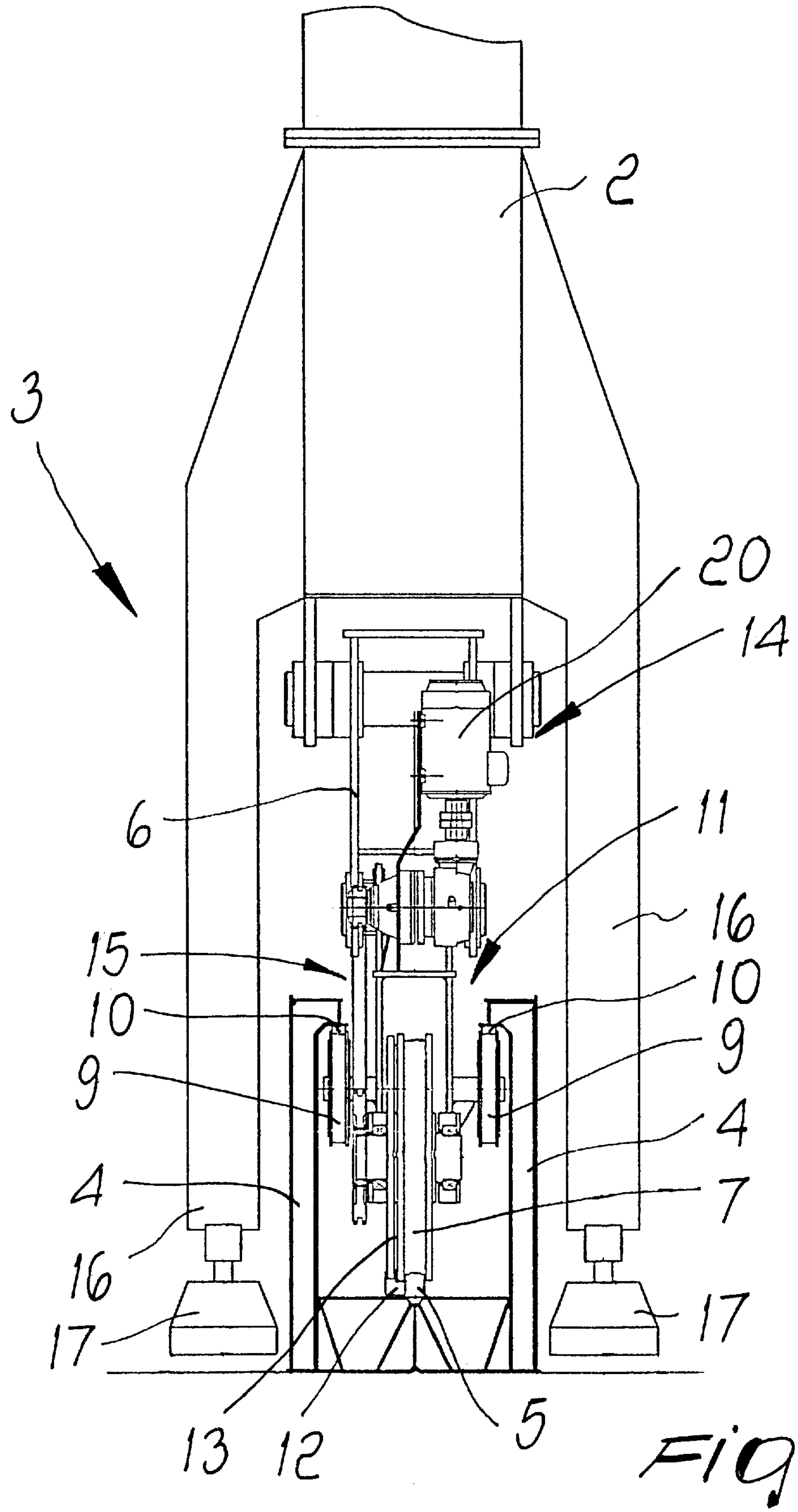
FIG. 3 is an enlarged-scale front view of a traversing assembly according to the invention.
Figure 4:
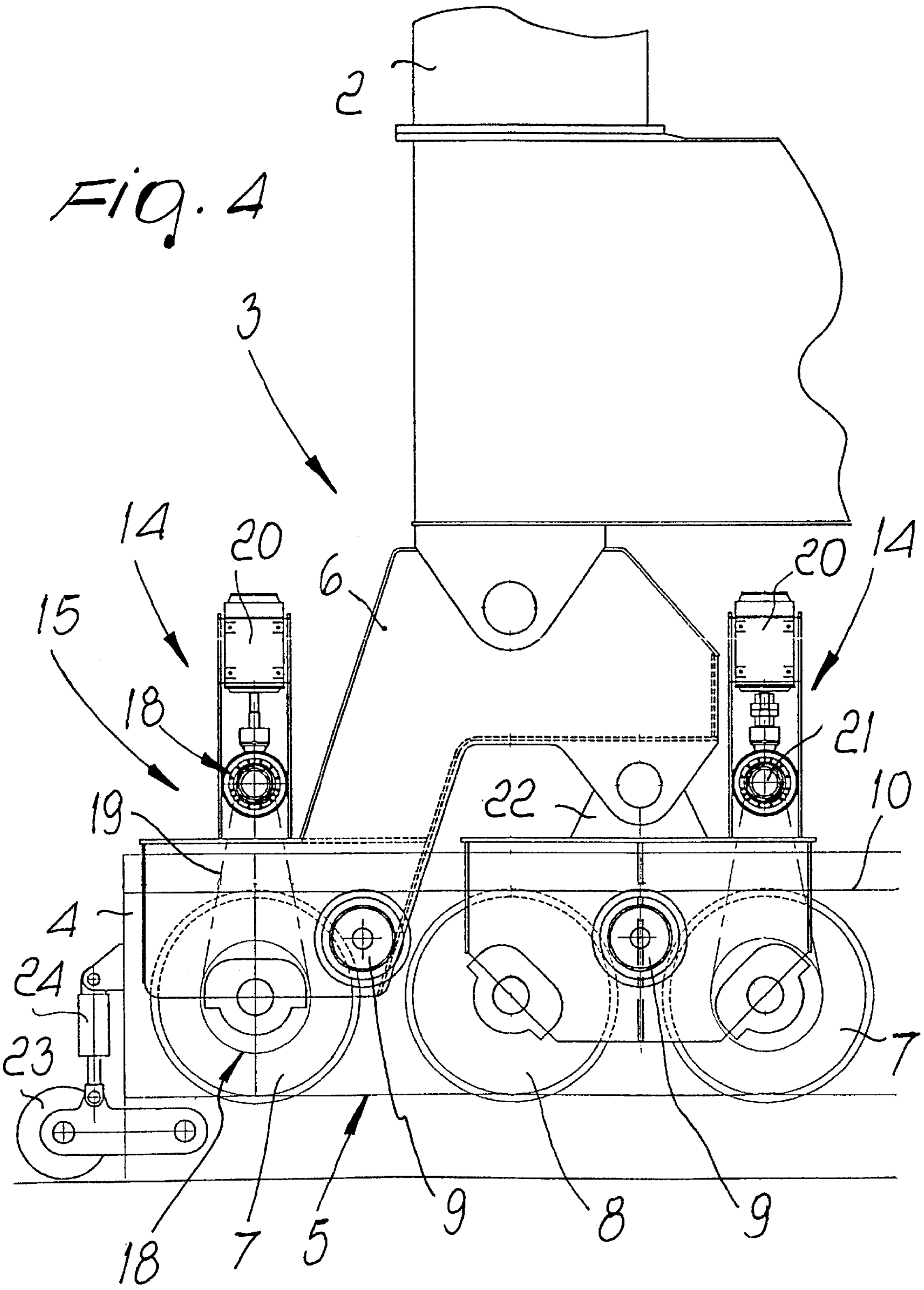
FIG. 4 is a side view of the assembly of FIG. 3.

With particular reference to the above FIG. 1 generally designates a crane in which each one of the legs 2 is provided with a universal traversing assembly 3 according to the invention.

The assembly 3 comprises a box-like tunnel 4 which has an adequate ground resting surface so as to reduce its pressure, is open in an upward region and has a portion of a rail 5 fixed to its base for the traversing motion of the leg 2.

A platform 6 is provided with two driving wheels 7 and with an idler supporting wheel 8 which are mutually aligned and are adapted to roll on the portion of rail 5.

Two pairs of mutually coaxial idler wheels 9 are freely mounted on the platform 6 and are arranged below a pair of upper guides 10 which are fixed to the tunnel 4 at the upper opening 11.

A rack 12 is fixed to the side of the portion of rail 5 and is meshed by respective pinions 13 which are rigidly coupled and coaxial to the two driving wheels 7.

The assembly 3 further comprises two motorization assemblies 14 which are rigidly coupled to the platform 6 and are coupled to elements for transmitting motion 15 to the respective driving wheels 7 and pinions 13.

Two stabilizers 16 are fixed to the leg 2 externally and laterally to the tunnel 4, and each one comprises two feet 17 for resting on the ground which can slide vertically in order to move from a lowered configuration for supporting the leg 2 to a raised inactive configuration.

In the supporting configuration, the tunnel 4 is raised from the ground and the pinions 13 produce the traversing motion of the tunnel 4 with respect to the leg 2; in the inactive configuration, the tunnel 4 rests on the ground, which can be of any kind, and the driving wheels 7 produce the traversing motion of the leg 2 with respect to the tunnel 4.

Advantageously, the rail portion 5, the rack 12 and the pair of guides 10 are mutually parallel and run along the entire length of the tunnel 4.

The transmission elements 15 are constituted by two sprockets 18 on which a chain 19 closed in a loop is wound, but it is possible to provide alternative embodiments of said elements.

Conveniently, the driving wheels 7 are mutually independent and have a motorization assembly 14 of their own which is constituted by a motor 20 of the electric, hydraulic or other type and by a reduction unit 21.

As an alternative, it is possible to provide the embodiment without using the reduction unit, by directly coupling the motor to the wheel.

The platform 6 supports one of the driving wheels 7 and a secondary platform 22 for supporting the second driving wheel 7 and the idler wheel 8.

The pairs of idler wheels 9 are mutually aligned and are arranged between the two driving wheels 7 and the supporting wheel 8, above them.

In order to facilitate the sliding of the tunnel 4, said tunnel is provided, at its two ends, with sliding rollers 23 provided with lifting means 24 of the hydraulic or other type which can be actuated in the raised inactive configuration of the feet 17: said rollers 23 prevent the tunnel 4 from sliding on the ground.

The operation of the invention is as follows: the crane 1 can perform a traversing motion in both directions of travel by means of the wheels 7 and 8 of each leg 2, which can slide on the rail portions 5 inside the respective tunnels 4, having a length related to the dimensions of the machine, depending on the space occupation and the tasks that said machine must perform.

Once the wheels 7 and 8 have reached the stroke limit of the tunnels, their traversing motion occurs in the following manner: the stabilizers 16 with which each leg 2 is provided are lowered, consequently lifting the tunnels 4, which continue to rest in correspondence with the guides 10 and the idler wheels 9.

Each tunnel 4 performs a traversing motion by means of the pinions 13 and the rack 12, which are actuated by the same motorization assemblies 14 and transmission elements 15 used for the traversing motion of the leg 2 of the crane 1.

Once the supporting feet 17 of the stabilizers 16 have been raised again, the weight of each leg 2 is applied again to the rail portion 5 and the crane is ready for a new traversing motion inside the tunnels 4.

In practice it has been found that the described invention achieves the intended aim and objects, i.e. to allow to use the crane on any terrain, becoming independent of the loads allowed on the runways, to rest the crane directly on the ground, allowing to widen or narrow, according to requirements or to the space available, the ground resting bases of the traversing assembly, so as to adapt to the load-bearing capacity of the ground and therefore be able to adapt to the existing ground without requiring structural work and also to allow the use of old wharves with limited capacities without having to perform modification or reinforcement work.

Moreover, there is no more constraint related to any existing gauges and the most adapted gauge and the most appropriate width of the tunnels, according to the type of terrain and to the type of crane or other structure that is adopted, can be freely selected.

Currently, in fact, since cranes must meet more demanding operating requirements for loading and unloading, their structures are larger and their outreaches are longer than in cranes used in the very recent past.

It is therefore impossible to arrange them on existing rails that are fixed to the various terrains and/or wharves, and were conceived for smaller cranes: these rails in fact have excessively narrow gauges to ensure stable support of current cranes and ensure their balance.

The present invention allows to provide each crane, regardless of its constructive dimensions, with an adapted track of its own, whose gauge and supporting surface have been adapted and sized according to that particular type of crane that it must support, so as to ensure its stability and balance on the various terrains on which it will be located.

Moreover, the tunnels with which the invention is provided have a length which is a multiple of the length of containers, thus allowing the machine to perform movements equal to the length of the containers to be handled.

The invention thus conceived is susceptible of numerous modifications and variations, all of which are within the scope of the appended claims.

All the details may further be replaced with other technically equivalent ones.

In practice, the materials used, as well as the shapes and the dimensions, may be any according to requirements without thereby abandoning the scope of the protection of the appended claims.

The disclosures in Italian Patent Application No. MO99A000220 from which this application claims priority are incorporated herein by reference.

What is claimed is:

1. A universal traversing assembly for a workpiece, comprising:

a platform;

a set of driving wheels and supporting wheels supported on said platform and aligned so as to roll on a long underlying rail for traversing motion of the workpiece;

a tunnel resting on the ground and including an upper opening and a base, a portion of said rail being fixed to said base;

a pair of upper guides fixed on said tunnel at the upper opening;

at least one pair of mutually coaxial idler wheels freely mounted on said platform and arranged below said pair of upper guides;

pinions rigidly coupled and coaxial with respect to said driving wheels;

a rack fixed to a side of said rail portion so as to mesh with said pinions;

at least one motorization assembly rigidly coupled to said platform and coupled to at least one of said driving wheels and pinions;

at least one stabilizer comprising at least one ground resting foot having an surface, said stabilizer being vertically slideable and moveable from a lowered configuration for supporting the workpiece to a raised inactive configuration, wherein, in said supporting configuration, the tunnel is raised from the ground and the pinions are actuated to produce traversing motion of the tunnel with respect to the workpiece, and wherein in the inactive configuration, the tunnel rests on the ground and the driving wheels are enabled to produce traversing motion of the workpiece with respect to the tunnel; and motion transmission elements comprising a closed loop chain and two sprockets around which the chain is wound, said motorization assembly being coupled to at least one of said driving wheels and pinions through said motion transmission elements.

2. The assembly of claim 1, wherein said set of driving wheels comprises two driving wheels and at least one interposed free supporting wheel.

3. The assembly of claim 1, wherein said portion of rail, said rack, and said upper guides, are mutually parallel and run along the entire length of said tunnel.

4. The assembly of claim 2, wherein said driving wheels are independent and are each provided with said motorization assembly.

5. The assembly of claim 4, comprising a secondary platform, said platform supporting a first one of said driving wheels, and said secondary platform supporting a second one of said driving wheels and said idler wheels.

6. The assembly of claim 5, comprising two pairs of idler wheels, which are mutually aligned, and are arranged between and above said driving wheels and supporting wheels.

7. A universal traversing assembly for a workpiece, comprising:

a platform;

a set of driving wheels and supporting wheels supported on said platform and aligned so as to roll on a long underlying rail for traversing motion of the workpiece;

a tunnel resting on the ground and including an upper opening and a base, a portion of said rail being fixed to said base;

a pair of upper guides fixed on said tunnel at the upper opening;

at least one pair of mutually coaxial idler wheels freely mounted on said platform and arranged below said pair of upper guides;

pinions rigidly coupled and coaxial with respect to said driving wheels;

a rack fixed to a side of said rail portion so as to mesh with said pinions;

at least one motorization assembly rigidly coupled to said platform and coupled to at least one of said driving wheels and pinions;

at least one stabilizer comprising at least one ground resting foot having an surface, said stabilizer being vertically slideable and moveable from a lowered configuration for supporting the workpiece to a raised inactive configuration, wherein, in said supporting configuration, the tunnel is raised from the ground and the pinions are actuated to produce traversing motion of the tunnel with respect to the workpiece, and wherein in the inactive configuration, the tunnel rests on the ground and the driving wheels are enabled to produce traversing motion of the workpiece with respect to the tunnel; and wherein said set of driving wheels comprises two said driving wheels and at least one interposed free supporting wheel;

wherein said driving wheels are independent and are each provided with said motorization assembly;

a secondary platform, said platform supporting one of said driving wheels, and said secondary platform supporting the second one of said driving wheels and said idler wheels;

two pairs of mutually aligned idler wheels arranged between and above said driving wheels and supporting wheels; and wherein said tunnel has, at two opposite ends thereof, sliding rollers and lifting means for said sliding rollers, which are actuatable in said inactive configuration.

8. The assembly of claim 7, comprising at least two said stabilizers arranged externally and laterally to said tunnel, each said stabilizer is provided with two of said supporting feet.

9. The assembly of claim 8 having at least one component that is adapted to be modifiable in at least one of position and length, based at least in part, to different operating conditions.

* * * * *